(12) United States Patent
Jones et al.

(10) Patent No.: US 6,291,795 B1
(45) Date of Patent: Sep. 18, 2001

(54) UNFOCUSED LASER BEAM DELIVERY SYSTEM

(75) Inventors: Gary L. Jones; James D. Jogerst, both of Campbell County, VA (US); Mark C. Knapp, Las Vegas, NV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/436,884

(22) Filed: Nov. 9, 1999

(51) Int. Cl.⁷ .................................................. B23K 26/00
(52) U.S. Cl. ............................... 219/121.63; 219/121.67; 219/121.78; 219/121.84
(58) Field of Search ........................... 219/121.6, 121.63, 219/121.78, 121.84

(56) References Cited

U.S. PATENT DOCUMENTS

| | | | |
|---|---|---|---|
| 4,273,127 | * | 6/1981 | Auth et al. ................................ 606/3 |
| 5,129,897 | * | 7/1992 | Daikuzono ................................ 606/16 |
| 5,318,023 | * | 6/1994 | Vari et al. ............................... 128/633 |
| 6,110,167 | * | 8/2000 | Cozean et al. ........................... 606/15 |

* cited by examiner

*Primary Examiner*—Samuel M. Heinrich
(74) *Attorney, Agent, or Firm*—Eric Marich

(57) ABSTRACT

A system is provided for delivering an unfocused laser beam through a first end of a fiber optic cable to a workpiece. The laser beam travels through the fiber optic cable and emerges from the second end of the fiber optic cable. The second end of the fiber optic cable is not covered with any coating or armor and has a polished exterior. The fiber optic cable is supported and guided by a blade which guides the fiber optic cable to the workpiece. The blade also provides cover gas and/or oxygen in the vicinity of the workpiece during welding or cutting operations.

19 Claims, 2 Drawing Sheets

UNFOCUSED LASER BEAM DELIVERY SYSTEM

The subject matter of the present invention was conceived and reduced to practice in the course of contracts with Pittsburgh Naval Reactors (Contract No. DE-AC11-92 PN38191) and Bettis Atomic Power Laboratory (Contract No. DE-AC11-73869699). The Government of the United States of America has certain rights to the invention.

FIELD AND BACKGROUND OF THE INVENTION

The present invention relates generally to laser systems and, more particularly, to a system for transmitting a high-power laser beam onto a workpiece for welding, cutting or other processing of the workpiece with an unfocused laser beam.

High-power, such as 2000 Watt average power, lasers have a wide variety of applications, such as precision drilling, cutting and welding of metal workpieces. Neodymium:Yttrium-aluminum-garnet (Nd:YAG) lasers are particularly useful for such purposes. The beam generated by a laser, such as a Nd:YAG laser, must be transmitted to a work station where the beam is directed onto the material of the workpiece. In the prior art, system comprising an assembly of mirrors, lenses and prisms is used to transmit the laser beam to the work station. While this type of arrangement functioned satisfactorily in some applications, such a system is bulky and the flexibility with which the beam may be maneuvered about the workpiece is limited.

Conventional focused welding techniques are known, such as an electron beam welding system which utilizes a gun which focuses an electron stream by manipulating a magnetic focus coil, or in the case of a laser which utilizes a focusing head or output coupler that comprises a series of lenses and mirrors for receiving an emerging laser beam from an end of a fiber optic cable and delivering and focusing such laser beam to a desired spot on the workpiece. A typical laser welding system uses at least one mirror to reflect the laser beam into the lens and at least one lens to focus the laser beam onto the workpiece.

However, in many instances the workpiece is accessible only through narrow openings. The size of the focusing head may prevent it from accessing the workpiece through the opening. This requires disassembling the components of the workpiece in order to perform the operation or prevents access altogether (cannot be welded).

Moreover, when a weld is made through a narrow opening, the resulting large beam diameter impinges on the sides of the opening. Further, the reach of the beam is limited and may only be to one half of a joint's length and thus requires that the weld be made with two passages-one from each side of the joint. Welding half of the joint at a time results in overlapping of the weld at the center and launching the beam from outside the narrow opening may cause impingement melting on the top of the opening.

SUMMARY OF THE INVENTION

It is an object of the present invention to provide a laser system for operating on a workpiece which is accessible through a narrow opening without having to disassemble the workpiece. Further, the present invention provides for a continuous pass weld and thus eliminates the need for multiple passes and overlap regions as well as eliminating impingement of the beam on other areas of the workpiece.

In accordance with the present invention, a system is provided for delivering a laser beam through a fiber optic cable onto a workpiece. The laser beam enters through a first end of the cable, propagates through the cable and emerges from the second end thereof. The fiber optic laser beam delivery system further comprises a blade which has a top portion and a bottom portion parallel to one another. The top portion has a curved front end which extends towards the bottom portion. The fiber optic cable overlaps the top portion of the blade and the emerging second end of the cable extends past the curved front end of the blade. The fiber optic cable is exposed and does not have any protective armor covering and/or poly/Kevlar® covering on the emerging second end of the cable. The emerging second end of the cable is polished to minimize beam diffusion and back reflection.

The blade supports and guides the fiber optic cable into an opening to access the joint to be operated on. The blade also supports a fiber burn back circuitry, as well as two gas tubes which delivers shield gas to the emerging second end of the fiber optic cable and a cover gas to the workpiece.

The present invention does not utilize a focusing head or output coupler which is conventionally attached to the second end of the fiber optic cable.

By removing the focusing head or output coupler and using, instead, a fiber optic cable having an exposed and polished end, very close positioning of the laser beam on the workpiece can be achieved even in a confined space.

Standoff distance is critical for this type of welding and is controlled by a CNC-3-axis fiber manipulator. By controlling the fiber standoff and travel speeds, welds with penetrations of up to 0.100 inches have been made in Inconel® 690 material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
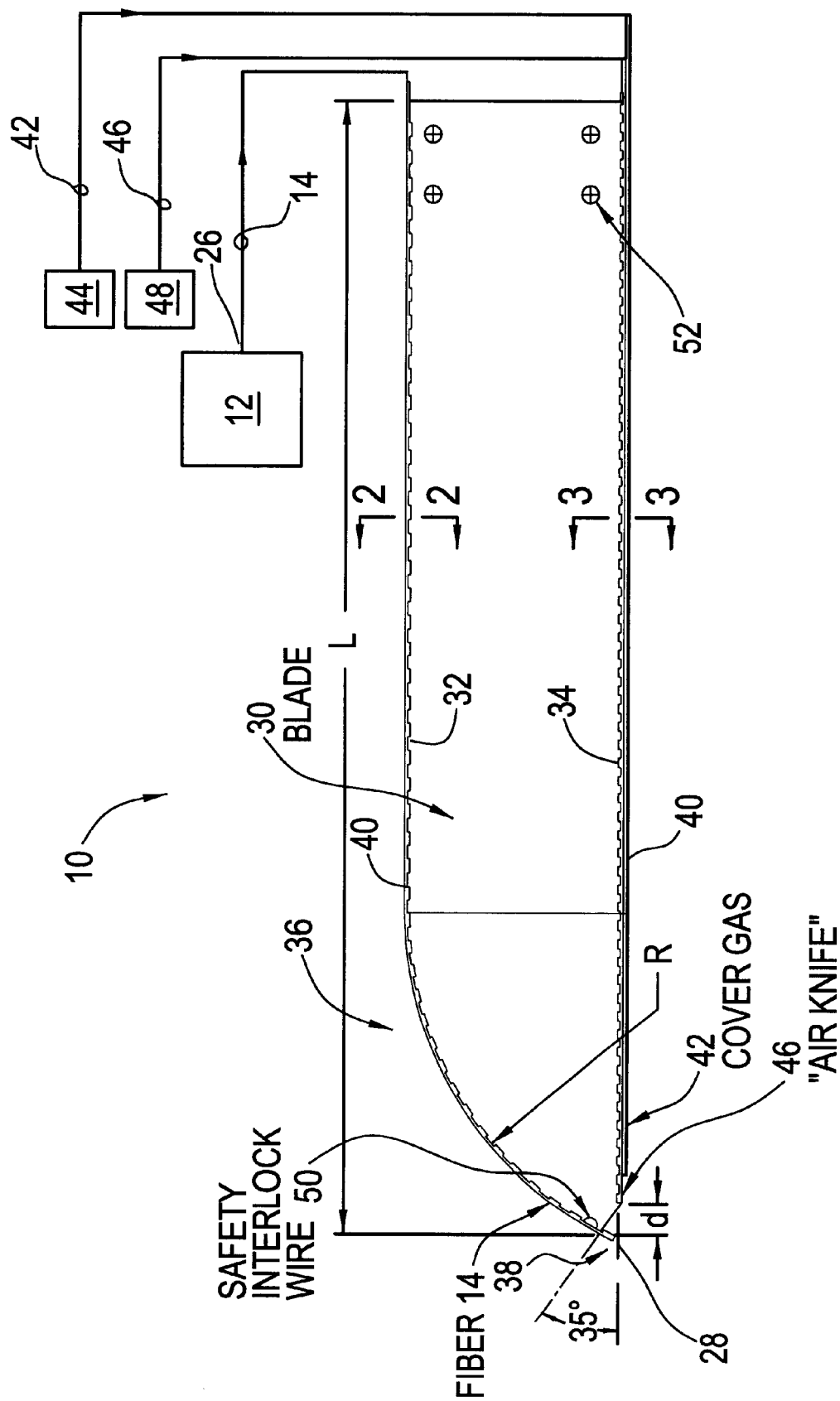
FIG. 1 is a schematic view illustrating the blade and optical fiber cable arrangement used in the unfocused laser beam delivery system of the present invention.

Referring to the drawings generally, wherein like reference numerals designate the same or functionally similar elements throughout the several drawings, and to FIG. 1 in particular, there is shown a laser beam delivery system, generally designated 10, for delivering an unfocused laser beam to weld a workpiece (not shown).

Conventional laser welding equipment utilizing a fiber optic delivered laser beam employs an end effector (not shown) which contains a series of lenses that up-collimate and focus the laser beam to a desired spot-size within a specific focal length. Bare fiber optic welding entails removing an output coupler (also not shown) which is normally attached to the end of a fiber optic delivery system which connects to a focusing head (also not shown).

The present invention was developed to enable production of welded seam joints located within an extremely difficult to access, internal portion of a component or workpiece (not shown). The joints to be made were approximately 15 inches long and yet access to the specific location where they were to be made was through a slot that had an average opening of only 0.070 inches. In addition, the welding direction was perpendicular to the access slot. As described earlier, conventional focused welding techniques such as electron beam welding and focused laser welding were not suitable to this specific task because the resulting beam diameter would be too large and thus would impinge on the sides of the access slot. Further, the "reach" of the electron beam is limited to just over half the length of the joint, requiring the weld to be performed in two segments—one from each side of the joint. Even with only welding half of the joint at a time and overlapping the weld in the center, impingement on the top of the slot region was a problem.

Briefly, the present invention overcomes these problems by removing the focusing head normally employed in a fiber optic delivered laser beam system and using a polished fiber optic cable secured to a blade to accomplish very close positioning of the fiber end to the workpiece. In this type of welding, standoff distance is critical and thus a computer numerically controlled (CNC)—3-axis fiber manipulator of known design is used to control both the optical fiber standoff distance and travel speeds to produce welds with penetrations of up to 0.100 inches in Inconel® 690 material.

Returning back to the Figures., and as illustrated in FIG. 1, the system 10 comprises a laser light generating means 12, such as an Nd:YAG laser, for generating high intensity laser light that is compatible with a fiber optic delivery system. Laser light generating means 12 may be of the type such as is available from Rofin Sinar, located in Hamburg, Germany or in Warwickshire, England. The system 10 further comprises laser light transmitting means 14, such as an elongated, flexible, fiber optic cable assembly, coupled to the laser means 12 for transmitting the laser light directly to a workpiece (not shown).

Figure 4:
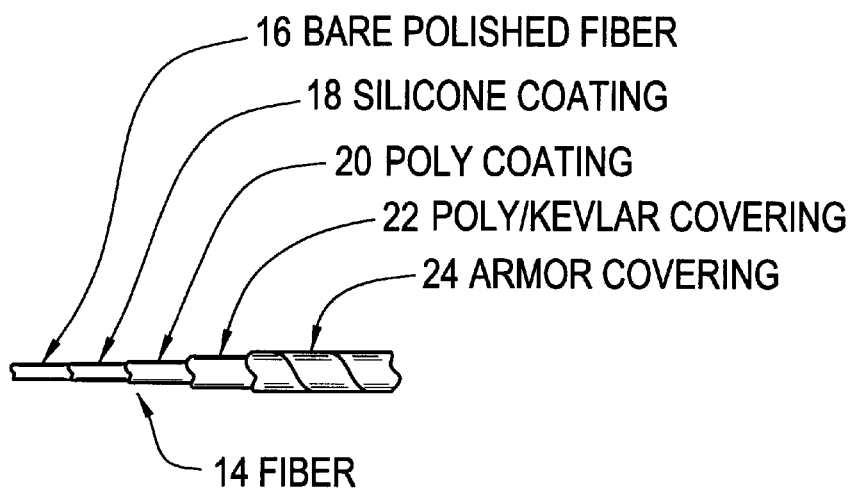
FIG. 4 is an enlarged side view of an optical fiber cable having a bare, polished tip which lies in a groove in the top portion of the blade of Fig. 1.

Referring to FIG. 4, the laser light transmitting means 14 advantageously comprises a fiber optic cable having a core with a bare polished end portion 16 enclosed in surrounding, overlapping, coatings and coverings as follows: a silicone coating 18 closest to and surrounding the fiber optic cable core; next, a poly coating 20; next, a poly/Kevlar® coating 22; and finally an exterior armor covering 24. In one preferred embodiment of the invention, the core of the fiber optic cable 14 is comprised of quartz fiber or silica. The emerging second end 28 (FIG. 1) is polished to minimize beam diffusion and back reflection.

Referring back to FIG. 1, the laser light transmitting means 14 has a first end 26 in communication with the laser light generating means 12 and an emerging second end 28 which, during a welding operation, will be positioned proximate the workpiece. As described above, the emerging second end 28 of the fiber optic cable 14 is polished and stripped of all surrounding coatings and coverings. The laser beam emerges from the emerging second end 28 of the fiber optic cable 14 and is directed onto a workpiece.

Figure 2:
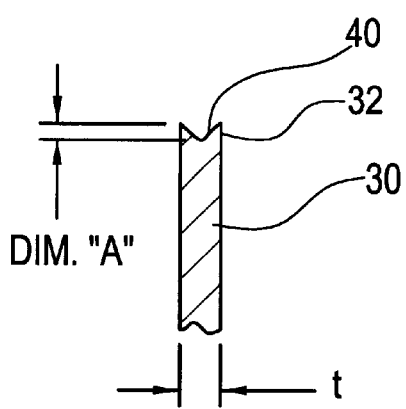
FIG. 2 is a sectional view of the blade of FIG. 1 viewed in the direction of arrows 2—2.
Figure 3:
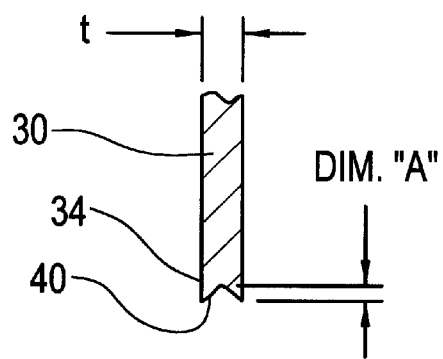
FIG. 3 is a sectional view of the blade of FIG. 1 viewed in the direction of arrows 3—3.

The fiber optic cable 14 and, more particularly, the emerging second end 28 thereof, is located proximate the workpiece by an slender, elongated blade 30 of length L having a top portion 32 and a bottom portion 34 which are parallel to one another along a rear portion of the blade. In one embodiment of the invention, the length L of blade 30 was approximately 18¾ inches long, approximately 3⁷⁄₁₆ inches wide. Preferably, blade 30 has a thickness t of about one millimeter (0.050 inches). The top portion 32 has a curved front end portion 36 of radius R which extends towards the bottom portion 34 of the blade 30. In one preferred embodiment of the invention, a tip portion 38 of the curved front end portion 36 forms an angle of approximately 35 degrees with respect to the bottom portion 34 of blade 30, and extends a distance d of approximately ⁹⁄₁₆ inch beyond an end of the bottom portion 34. As illustrated, the emerging second end 28 of the optical fiber 14 extends beyond the tip portion 38 of the blade 30. As illustrated in FIGS. 2 and 3, both the top portion 32 and the bottom portion 34 of the blade 30 are provided with a V-shaped groove 40. The fiber optic cable 14 lies along and is supported by the V-shaped groove 40 in the top portion 32; the V-shaped groove 40 also extends along the curved front portion 36 and thus the fiber optic cable 14 lies along and is supported by the V-shaped groove 40 substantially along the entire perimeter of the blade 30. Preferably, V-shaped groove 40 has a depth (DIM. A) of approximately 0.025 inches.

During use, the polished and exposed emerging second end 38 of the fiber optic cable 14 is thus positioned proximate the workpiece to deliver the beam of laser light. The blade 30 also positions additional elements of the present invention to this same location. More particularly, blade 30 supports, along its bottom portion 34, cover gas supply means 42 for delivering a cover gas from a source 44, and/or inert gas or "air knife" means 46 for delivering an inert gas from a source 48. Advantageously, both the cover gas supply means 42 and the air knife means 46 comprise small diameter tubes (0.050 inch diameter) which lie along and are supported by the V-shaped groove 40 in the bottom portion of the blade 30. As illustrated in FIG. 1, the cover gas supply means 42 overlaps the inert gas supply or air knife means 46 but these locations can be reversed if necessary.

The cover gas supply means 42 transmits cover gas to the vicinity of the emerging second end 28 of the fiber optic cable 14. The supplied cover gas is applied to the emerging second end 28 of the fiber optic cable 14 as a cooling agent along with the unfocused laser beam. Thus, it may be appreciated that the same cover gas used to shield the emerging second end 28 from the heat caused by the propagation of the high-power laser beam therethrough may be the same gas used to assist the unfocused beam in welding, cutting, or processing the workpiece. If the workpiece, which is typically metal, is to be cut or drilled, oxygen may be employed. In welding applications an inert gas, such as helium or argon, may be used to both shield the emerging second end 28 and to provide an inert cover gas for the welding operation, that is, a gas which displaces the air over the surface of the workpiece to be welded in order to prevent nitride or oxide formation at the weld joint and thus make such joint more sound. Thus, the inert gas is used in the present invention as a "cover" gas and as a cooling/shielding agent to cool the emerging second end 28 of the laser light transmitting means 12.

In addition, since the emerging output end 28 of the fiber optic cable 14 is bare, an important feature of the present invention involves provision of a safety interlock system. As schematically illustrated in FIG. 1, a very small wire circuit 50 is provided at the emerging output end 28 and which is interconnected back to a shutter (not shown) within the laser light generating means 12. If the optical fiber burns back during welding, the wire circuit 50 also burns and severs, interrupting the circuit and shutting the shutter in the laser light generating means 12 to terminate the laser beam, thereby protecting the workpiece and the operator.

Finally, the blade 30 may be attached to a CNC manipulator by any suitable means, such as bolts or other fasteners (not shown) coupled to apertures 52 in a rear portion of the blade 30.

The specific advantages of the present invention are several. First, the delivered laser beam does not impinge on the sides of the access slot through which the blade and fiber optic cable is inserted. Second, the length of the weld to be performed is not a consideration since the length L of the blade can be made any length. This allows the weld to be made in a continuous pass eliminating the need for multiple passes and overlap regions. Third, the welds produced using the apparatus according to the present invention have a smooth, uniform radius which is ideal in minimizing corners and transitions which would otherwise create stress risers. Last but not least, the main advantage of the present invention is that it provides freedom of access to joints which are not accessible when using a focusing head. The apparatus according to the present invention can be used to perform welds on internal joints of components without disassembly of the components. The only limitations presented are those involved with the making of the necessary tooling to reach the joint within the component.

While a specific embodiment of the invention has been shown and described in detail to illustrate the application of the principles of the invention, it will be understood that the invention may be embodied otherwise without departing from such principles.

We claim:

1. A system for delivering an unfocused laser beam to a workpiece, comprising:
    laser light generating means for generating high intensity laser light;
    fiber optic cable means for transmitting high intensity laser light from the laser light generating means to the workpiece; and
    slender, elongated blade means for locating a bare end of the fiber optic cable means proximate to the workpiece and for supporting cover gas means for providing a cover gas to a vicinity of the bare end of the fiber optic cable means proximate to the workpiece.

2. The system according to claim 1, wherein the bare end of the fiber optic cable is polished and the fiber optic cable means comprises, at locations other than at the bare end of the fiber optic cable means proximate to the workpiece, a silicone coating surrounding a fiber optic cable core, a poly coating, a poly/Kevlar® coating, and an exterior armor covering.

3. The system according to claim 1, wherein the fiber optic cable means comprises a core of one of quartz or silica and, at locations other than at the bare end of the fiber optic cable means proximate to the workpiece, a surrounding armor covering.

4. The system according to claim 1, wherein the blade means comprises a top portion and a bottom portion which are parallel to one another along a rear portion of the blade means, and a curved front end portion which extends towards the bottom portion.

5. The system according to claim 4, wherein the blade means has a thickness of about one millimeter.

6. The system according to claim 4, wherein a tip portion of the curved front end portion of the blade means forms an angle of approximately 35 degrees with respect to the bottom portion of the blade means, and the bare end of the fiber optic cable means extends beyond the tip portion.

7. The system according to claim 4, wherein the top portion of the blade means comprises a V-shaped groove which supports the fiber optic cable means.

8. The system according to claim 4, wherein the bottom portion of the blade means comprises a V-shaped groove which supports the cover gas means.

9. The system according to claim 8, further comprising air knife means supported along the V-shaped groove in the bottom portion of the blade means.

10. The system according to claim 9, wherein the cover gas means and the air knife means comprise small diameter tubes.

11. A system for delivering an unfocused laser beam to a workpiece, comprising:
    laser light generating means for generating high intensity laser light;
    fiber optic cable means for transmitting high intensity laser light from the laser light generating means to the workpiece;
    slender, elongated blade means for a locating a bare end of the fiber optic cable means proximate to the workpiece and for supporting cover gas means for providing a cover gas to a vicinity of the bare end of the fiber optic cable means proximate to the workpiece; and
    safety interlock means for shutting down the laser light generating means if the bare end of the optical fiber burns back during delivery of the high intensity laser light to the workpiece.

12. The system according to claim 11, wherein the safety interlock means comprises a very small wire circuit provided in the vicinity of the bare output end of the optical fiber and interconnected back to the laser light generating means which, if the optical fiber burns back during delivery of the high intensity laser light to the workpiece, also burns and severs, interrupting the circuit and terminates the generation of the high intensity laser light.

13. The system according to claim 11, wherein the blade means comprises a top portion and a bottom portion which are parallel to one another along a rear portion of the blade means, a curved front end portion which extends towards the bottom portion, and a tip portion of the curved front end portion of the blade means which forms an angle of approximately 35 degrees with respect to the bottom portion of the blade means.

14. The system according to claim 11, wherein the blade means has a thickness of about one millimeter.

15. The system according to claim 13, wherein the bare end of the fiber optic cable means extends beyond the tip portion.

16. The system according to claim 13, comprising a V-shaped groove in the top portion of the blade means which supports the fiber optic cable means, and a V-shaped groove in the bottom portion of the blade means which supports the cover gas means.

17. The system according to claim 16, further comprising air knife means supported along the V-shaped groove in the bottom portion of the blade means.

18. The system according to claim 17, wherein the cover gas means and the air knife means comprise small diameter tubes.

19. An apparatus for supporting and locating both a bare end of a fiber optic cable used to deliver high intensity laser light to a workpiece, and means for providing a cover gas proximate to a workpiece, comprising:

a slender, elongated blade having a V-shaped groove in a top portion of the blade which supports the fiber optic cable, a V-shaped groove in a bottom portion of the blade which supports the cover gas means, the top and bottom portions being parallel to one another along a rear portion of the blade, a curved front end portion which extends towards the bottom portion, and wherein a tip portion of the curved front end portion of the blade forms an angle of approximately 35 degrees with respect to the bottom portion of the blade means such that the bare end of the fiber optic cable extends beyond the tip portion.

* * * * *